Figure 1:
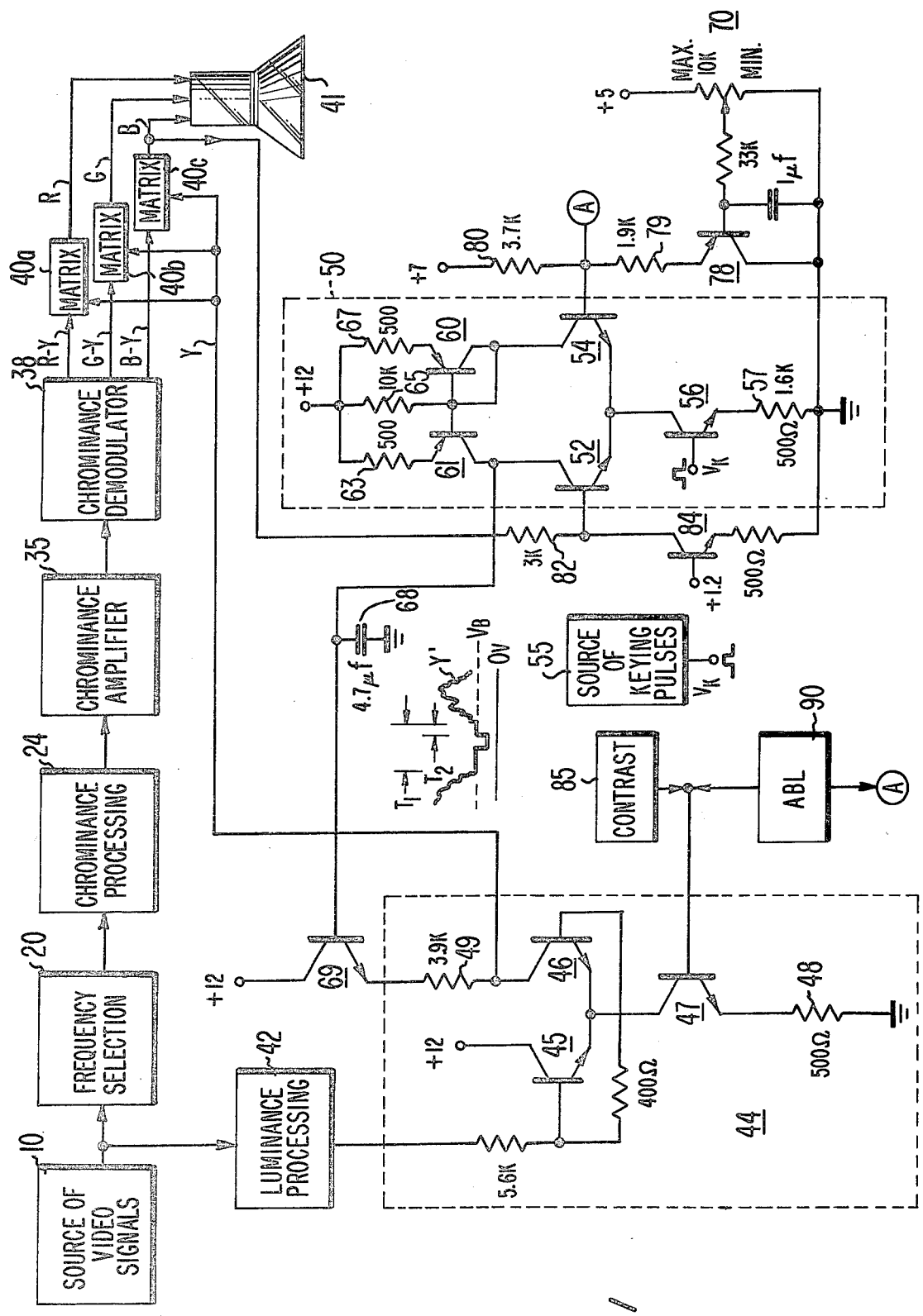

United States Patent [19]

Tuma et al.

[11] 4,197,557
[45] Apr. 8, 1980

[54] BRIGHTNESS CONTROL CIRCUIT EMPLOYING A CLOSED CONTROL LOOP

[75] Inventors: Alois V. Tuma, Schlieren, Switzerland; Leopold A. Harwood, Bridgewater, N.J.; Willem H. Groenweg, Ottenbach, Switzerland

[73] Assignee: RCA Corporation, New York, N.Y.

[21] Appl. No.: 794,128

[22] Filed: May 5, 1977

[51] Int. Cl.$^2$ .................... H04N 5/16; H04N 5/14; H04N 5/18

[52] U.S. Cl. .................................. 358/34; 358/168; 358/172

[58] Field of Search ............... 358/21, 34, 39, 40, 358/168, 171, 176, 172

[56] References Cited

U.S. PATENT DOCUMENTS

| | | | |
|---|---|---|---|
| 2,930,843 | 3/1960 | Cooper | 358/34 |
| 2,965,705 | 12/1960 | Luther, Jr. | 358/39 |
| 3,543,169 | 11/1970 | Hill | 358/171 X |
| 3,588,341 | 6/1971 | Hansen | 358/21 X |
| 3,651,248 | 3/1972 | Schneider | 358/34 |
| 3,885,093 | 6/1973 | Mooney | 358/172 |
| 3,921,205 | 11/1975 | Fujiwara et al. | 358/34 |
| 3,959,811 | 5/1976 | Shanley | 358/34 X |
| 3,985,954 | 10/1976 | Kuniyoshi et al. | 358/171 |
| 3,996,609 | 12/1976 | Avery | 358/39 X |
| 4,044,375 | 8/1977 | Norman | 358/40 |
| 4,059,838 | 11/1977 | Banker et al. | 358/40 X |
| 4,110,787 | 8/1978 | Parker | 358/34 |
| 4,122,492 | 10/1978 | Gallo | 358/34 |

OTHER PUBLICATIONS

"Fernsehtechnick"; Schroter, 2nd part, 1963, Springer-Verlag, pp. 29-34.

Primary Examiner—Robert L. Griffin
Assistant Examiner—Aristotelis M. Psitos
Attorney, Agent, or Firm—Eugene M. Whitacre; William H. Meagher; Ronald H. Kurdyla

[57] ABSTRACT

Brightness control apparatus for a video signal image reproducing system including a video signal processing channel, a source of reference voltage for establishing a desired level of image brightness, and a keyed comparator circuit. The comparator forms a closed control loop with the signal processing channel, and is keyed during periodic blanking intervals of the video signal to sense the magnitude of the reference voltage and a brightness representative blanking level of the video signal which may vary undesirably. The comparator provides an output control signal indicative of a voltage difference between the reference voltage and the blanking level. The control voltage is applied to the signal channel for translating the blanking level in a direction to minimize the voltage difference, so that a desired relationship between the reference voltage and the blanking level is preserved.

14 Claims, 2 Drawing Figures

BRIGHTNESS CONTROL CIRCUIT EMPLOYING A CLOSED CONTROL LOOP

This invention relates to image brightness control apparatus for video signal processing systems, and more particularly, to such apparatus operatively associated in a closed control loop configuration with luminance or chrominance signal processing circuits of a color television receiver.

Image information of a composite television signal is defined by a luminance component in the case of a monochrome television signal, and by both the luminance component and a chrominance component in the case of a color television signal. In either case, a brightness reference level is contained in a black level of the luminance component. Viewer control of image brightness typically is accomplished by means of a manually adjustable potentiometer, which serves to provide a reference voltage representative of a desired level of image brightness.

Numerous brightness control arrangements are known. For example, U.S. Pat. Nos. 3,597,540 and 3,588,341 each describe color television receiver brightness control circuits arranged in a closed control loop configuration. In U.S. Pat. No. 3,597,540, a reference voltage indicative of a desired brightness level of an image representative signal is compared with a voltage derived from a green signal driver amplifier during a scanning or trace interval of the video signal. A resulting control voltage is employed to adjust a D.C. operating level of the red, blue and green signal driver amplifiers in a closed loop control system. U.S. Pat. No. 3,588,341 describes a related system wherein a reference voltage level, corresponding to a desired brightness level, is compared with the level of the video signal during the scanning interval to derive a control voltage. The control voltage is utilized to control the D.C. level of the video signal.

The blanking level of the video signal approximates the black level of the video signal. It is desirable for the brightness determining blanking level of a video output signal, which is to be coupled to an image reproducing device, to exhibit a fixed relationship (i.e., track closely) with the reference voltage which corresponds to a desired level of brightness of a reproduced image. However, the blanking level of the video output signal can vary from the desired relationship due to variations of the operating characteristics of circuitry which process the video signal after the blanking level has been established in response to the brightness reference voltage. Such variations can be caused by voltage drift attributable to temperature changes or supply voltage variations, for example.

It is therefore advantageous to compensate for such variations so that the blanking level of the video output signal and the brightness reference voltage are maintained in a substantially fixed, desired relationship such that deviations from such relationship are kept to an acceptable minimum. An unstable blanking level can cause perceivable variations of the brightness of a reproduced image, which can be disconcerting to a viewer. Although such variations can be compensated by manually readjusting the brightness reference voltage, such readjustment can be time consuming and inconvenient, and therefore undesirable.

Apparatus in accordance with the present invention includes a video signal transmission channel for processing an image representative video signal. The video signal comprises periodically recurring image intervals, and intervals, and image blanking intervals disposed between succeeding image intervals and containing a blanking level determinative of image brightness. A source of brightness reference signal and a source of keying signals coincident with a portion of the blanking interval containing the blanking level are also included. A comparator network is responsive to the keying signals and serves to compare the reference signal and the blanking level, which is sensed at a first point in the signal transmission channel. The comparator provides a control signal representative of a difference between the magnitude of the reference signal and the blanking level. The control signal is coupled to a second point in the signal transmission channel, prior to the first point, to form a closed loop with the signal transmission channel, for varying the blanking level in a direction to reduce the difference to a minimum.

In a preferred embodiment of the present invention in a color television receiver system, a video signal transmission path includes a chrominance channel for processing a chrominance component of the video signal, and a luminance channel for processing a luminance component of the video signal. The keyed comparator provides a control signal indicative of a difference between the reference signal and the blanking level, which is sensed at an output of the chrominance channel. The control signal is coupled to the luminance channel at a point in the signal transmission path prior to the point at which the blanking level is sensed, for adjusting the blanking level of the luminance component.

Figure 2:
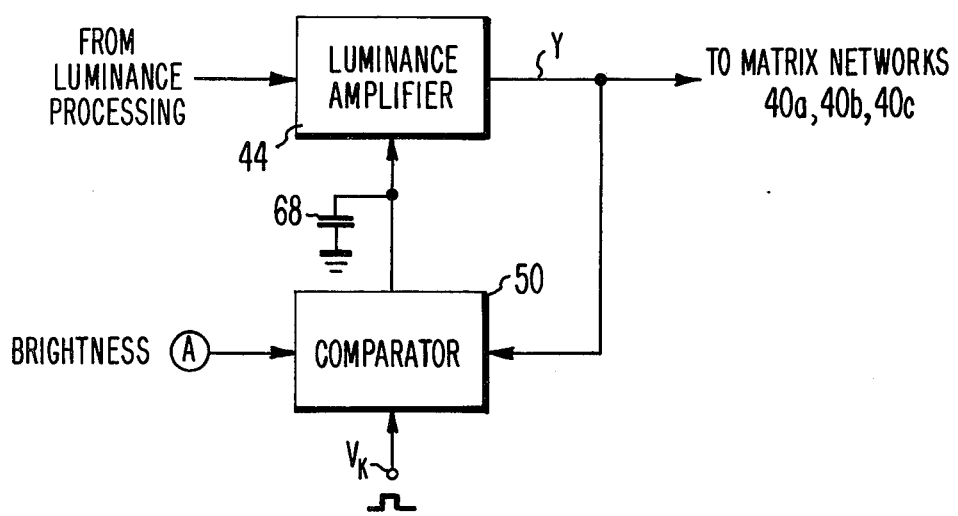

In the drawing:

FIG. 1 is a diagram partially in block form and partially in schematic diagram form of a portion of a color television receiver employing apparatus in accordance with the present invention; and FIG. 2 is a block diagram illustrating an alternative embodiment of the present invention.

In FIG. 1, a source of video signals 10 provides detected composite video signals comprising luminance, chrominance, sound and synchronizing signal components. The chrominance component is coupled via a frequency selection unit 20 to a chrominance signal processing unit 24 of a chrominance channel of the receiver. Chrominance processing unit 24 may, for example, include a signal amplification stage as well as automatic color control (ACC) and automatic phase control (APC) stages. Processed signals from unit 24 are further amplified by a chrominance amplifier 35 and are supplied to a chrominance demodulator 38 for deriving R-Y, B-Y and G-Y color difference signals. The R-Y, G-Y and B-Y color difference signals are each combined with a luminance signal Y in matrix networks 40a, 40b and 40c, respectively, to produce R, G and B color representative signals. The R, G and B signals are coupled to a kinescope 41 via suitable kinescope driver stages (not shown).

A luminance signal processing unit 42 of a luminance channel of the receiver serves to amplify and otherwise process the luminance component of the composite video signal from source 10. The processed luminance signals are supplied to a luminance amplifier 44 comprising a pair of transistors 45, 46 arranged in differential amplifier configuration, and a current source including a transistor 47 and a resistor 48 for supplying operating currents to transistors 45 and 46. A load circuit for amplifier 44 comprises a common collector bias transistor 69 and a load resistor 49 arranged in a collector circuit of transistor 46. An amplified luminance signal (Y) appears at a collector electrode of transistor 46 and is coupled to each of matrix networks 40a, 40b and 40c. Matrix networks 40a, 40b and 40c can be any suitable active or passive network for combining video signals (e.g., a resistive matrix).

Luminance signal Y contains a periodically recurring horizontal line retrace blanking interval $T_1$ disposed between individual horizontal line image trace intervals containing luminance image information Y'. The blanking interval comprises a negative-going line synchronizing pulse and a blanking level $V_B$ (i.e., a brightness reference level). Blanking level $V_B$ does not vary with image information and approximates a black level of the luminance signal. However, variations of the blanking level produce corresponding variations of the brightness level of a reproduced image.

In the case of a composite color television signal, a portion of a so-called "back porch" time interval ($T_2$) of the composite video signal contains several cycles of a color subcarrier reference signal (i.e., a color burst reference signal) of a frequency of approximately 3.58 MHz according to United States television standards. The burst signal is removed from the luminance signal by a preceding 3.58 MHz trap (not shown), so that interval $T_2$ contains only the brightness reference blanking level.

Adjustment of image contrast is accomplished via a contrast control unit 85 (e.g., a viewer adjustable potentiometer). Contrast control 85 serves to vary the current conduction of current source transistor 47 and thereby the gain of amplifier 44, and consequently the peak-to-peak amplitude of the luminance signal appearing at the collector of transistor 46.

Adjustment of image brightness is accomplished via a network including a source of positive D.C. potential (+5 volts) and an associated brightness control potentiometer 70. For example, increased brightness is provided by adjusting a wiper of potentiometer 70 toward an extreme upper position (MAX). This serves to increase the base bias of a PNP transistor 78 such that the conduction of transistor 78 is reduced. An increased voltage then appearing at an emitter of transistor 78 is D.C. translated to a more positive level via a voltage divider comprising series resistors 79, 80 and a source of potential (+7 volts). A corresponding translated direct voltage appearing at a circuit point A is representative of a brightness reference voltage developed in accordance with the position of the wiper of brightness control potentiometer 70, and is coupled to an input of a high gain, keyed differential comparator circuit 50.

In this example, a brightness reference D.C. voltage at the wiper of brightness control potentiometer 70 can be adjusted between zero and five volts. Resistors 79 and 80 together with transistor 78 serve to translate this voltage range to a more positive voltage range of about five to seven volts at point A and the base of transistor 54. The latter voltage range is selected so as to conform with an expected voltage range of the blanking level (approximately five to seven volts) occuring during time $T_2$, since this level is related to image brightness.

Comparator 50 comprises a pair of emitter coupled transistors 52 and 54 arranged in differential amplifier configuration. Operating currents for transistors 52 and 54 are supplied via a keyed current source transistor 56 and a resistor 57. An active load network for transistors 52, 54 includes a current mirror arrangement comprising a transistor 61, a diode-connected transistor 60, a resistor 65 and current matching resistors 63 and 65, all arranged as shown.

The translated brightness reference voltage from potentiometer 70 is coupled to a base input of comparator transistor 54 via point A. A base input of comparator 52 is coupled to the blue (B) signal output of matrix network 40c via a D.C. voltage translating resistor 82, which serves to establish a desired dynamic operating range of comparator 50. The collector current of a transistor 84 flowing in resistor 82 provides a D.C. level shift and a bias reference for transistor 52. A collector output of transistor 52 is coupled to a charge storage capacitor 68 and to a base electrode of transistor 69. A signal appearing at the collector of transistor 52 and across capacitor 68 serves to control the blanking level of luminance signal Y appearing at the collector of transistor 46 of luminance amplifier 44, as will be discussed.

An automatic beam current limiting (ABL) unit 90 is operatively associated with the brightness and contrast control functions, as described in detail in our copending U.S. patent application Ser. No. 794,127 entitled "Improved Average Beam Current Limiter", filed concurrently with this application and assigned to the same assignee as the present invention.

Neglecting comparator 50 for the moment, the blanking level of the luminance signal and hence the brightness of a reproduced image are controlled in response to a voltage appearing at the base electrode of transistor 69. For example, a reduction of the voltage at the base of transistor 69 is associated with a corresponding reduction of the emitter voltage of transistor 69. Since the collector current of transistor 46 is determined by the current supplied from current source transistor 47 and this current remains unchanged at this time, the collector current of transistor 46 remains unchanged. The voltage drop across resistor 49 due to the collector current of transistor 46 therefore remains unchanged, so that the collector voltage of transistor 46 is reduced by the same amount that the base and emitter voltages of transistor 69 are reduced. The blanking level of the luminance signal appearing at the collector of transistor 46 therefore is reduced by the same amount. This reduction in blanking level is in a direction to reduce the brightness of a reproduced image.

Comparator 50, luminance amplifier 44 and matrix 40c formed a closed control loop (i.e., a servo loop) for maintaining a substantially fixed relationship between the D.C. voltage setting of potentiometer 70 (representing a desired brightness or blanking level of a reproduced image), and the brightness determining blanking level of the signal (B) applied to kinescope 41 from matrix 40c. Comparator 50 and capacitor 68 are arranged as a "sample and hold" network. "Sampling" occurs during the burst interval of time $T_2$, and "holding" occurs during the remainder of each horizontal line cycle.

Current source transistor 56 of comparator 50 and consequently transistors 52 and 54 are keyed "on" (i.e., rendered conductive) during the sampling period in response to positive periodic keying pulses $V_K$ applied to the base of transistor 56 during the burst interval of time $T_2$. The periodic keying pulses are supplied from a source of keying pulses 55, which can be of the type described in a copending U.S. patent application, Ser. No. 661,855, of G. K. Sendelweck, filed Feb. 27, 1976 and assigned to the same assignee as the present invention. Since time $T_2$ corresponds to a portion of a blanking or image retrace time during which luminance and chrominance image information is not present in the video signal, the video output signal from matrix 40c coupled to the base of transistor 52 contains only the blanking level component at this time.

Under static brightness control conditions for a given setting of potentiometer 70 and a given time when transistor 56 is keyed "on", comparator 50 compares the voltage then appearing on the base of transistor 54 (corresponding to a desired brightness level in accordance with the setting of potentiometer 70), with the voltage then appearing on the base of transistor 52 (corresponding to the brightness representative blanking level of the signal then appearing at the output of matrix network 40c). If a voltage imbalance exists between these voltages, by differential action comparator 50 generates a control signal at the collector of transistor 52, and hence across capacitor 68 and at the base of transistor 69, of a magnitude and direction to reduce the imbalance toward zero such that the difference between the base voltages of transistors 52 and 54 approaches zero (i.e., zero error). The amount by which this difference can be made to approach zero is a function of the gain of comparator 50. Increasing the gain of comparator 50 increases the capability of reducing this difference, or error, to zero.

A difference in voltage between the base electrodes of comparator transistors 52 and 54 can be due to readjustment of the setting of potentiometer 70, or to a shift of the blanking level of signal B due to temperature changes or otherwise.

For example, assume that the base voltage of transistor 52 increases with respect to the base voltage of transistor 54. This condition can be caused by the blanking level of signal B undesirably drifting to a more positive level corresponding to increased brightness, or by adjustment of potentiometer 70 toward the MIN position. In this event, the collector current of and collector voltage of transistor 52 increase and decrease, respectively, relative to the collector current and voltage of transistor 54 by virtue of the differential action of comparator 50 during the keying interval of time $T_2$. For this condition, the relatively increased collector voltage of transistor 54 is in a direction to bias PNP transistor 61 for reduced current conduction. A charge otherwise appearing across capacitor 68 is depleted (discharged) via transistor 52 in proportion to the level of conduction of transistor 52. The base voltage of transistor 69 decreases a corresponding amount, causing the blanking level of luminance signal Y at the collector of transistor 46 to also decrease a corresponding amount as discussed earlier. The reduction of the blanking level of luminance signal Y is in a direction to reduce the potential difference between the base electrode of comparator transistors 52, 54 toward zero, corresponding to the desired relationship.

Conversely, when the base of transistor 54 is positive relative to the base of transistor 52, the conduction of transistors 54 and 52 respectively increase and decrease during the keying interval. A voltage then appearing at the collector of transistor 54 serves to bias PNP transistor 61 for increased current conduction, and the collector current of transistor 61 serves to charge capacitor 68 and thereby raise the base voltage of transistor 69. In this case the increased base voltage of transistor 69 serves to raise the blanking level of luminance signal Y at the collector of transistor 46 in a direction to reduce the potential difference between the base electrodes of transistors 52 and 54 toward zero.

During the interval when transistor 56 is not keyed "on", comparator 50 is essentially disconnected from capacitor 68, since transistors 52, 54 and 61 are non-conductive during this time. It is noted that comparator 50 is keyed "on" only during the relatively short keying interval (about three microseconds) of time $T_2$. However, it is necessary to hold the charge on capacitor 68 during the image trace interval (approximately sixty microseconds) of each horizontal line scanning period. This is accomplished by employing the current mirror arrangement including PNP transistors 60 and 61 in the collector circuit of comparator transistor 52. Such arrangement presents a very high impedance discharge path for capacitor 68 when comparator 50 is non-conductive during the image interval, and also desirably exhibits substantially no voltage drop or temperature losses when comparator 50 is keyed.

Referring now to FIG. 2, there is shown a brightness control arrangement wherein only luminance amplifier 44 and keyed differential comparator 50 are included in a closed control loop. The arrangement of FIG. 2 differs from that of FIG. 1 in that matrix network 40c is not included in the control loop.

Considering FIG. 2 together with FIG. 1, signals are coupled to and supplied from luminance amplifier 44 and comparator 50 as shown in FIG. 1, except that the output of luminance amplifier 44 (i.e., the collector of transistor 46 in FIG. 1) rather than the output of matrix 40c is coupled to an input of comparator 50 (i.e., the base of transistor 52 in FIG. 1). Comparator 50 of FIG. 2 serves the same purpose as discussed in connection with FIG. 1, except that in the FIG. 2 arrangement the brightness representative blanking level of luminance signal Y is directly sensed during the keying interval.

The arrangement of FIG. 2 can be employed in both monochrome and color video signal processing systems.

Although the invention has been disclosed in terms of particular embodiments, it should be recognized that other arrangements can be devised by those skilled in the art without departing from the scope of the invention.

For example, although comparator 50 has been shown to be responsive to the output signal from matrix network 40c, comparator 50 could also be arranged to sense the outputs of matrix networks 40b or 40c, or a combination of the matrix outputs. In this connection, it is noted that the arrangement of luminance amplifier 44, matrix networks 40a–40c, comparator 50, source 55, and other portions of the systems shown in FIG. 1 can be fabricated in either discrete or integrated circuit form. Temperature changes associated with each of the R, B and G matrix networks are substantially the same when these matrix networks share a common thermal environment and are in close physical proximity, as on an integrated circuit chip. In such case, when shifts in the blanking level of the matrixed color signals can be expected due to temperature changes for example, only one matrix network (e.g., network 40c) need be included in the closed control loop.

Also, other configurations for comparator 50 are possible.

What is claimed is:

1. In a system including a video signal transmission channel for processing an image representative video signal having periodically recurring image intervals, and image blanking intervals disposed between adjacent image intervals and containing horizontal synchronizing information and a blanking level determinative of image brightness, apparatus comprising:

a source of reference signal representative of a desired level of image brightness;

a source of keying signals recurring during each blankings interval and coincident with a portion of said blanking interval containing said blanking level;

a keyed sampling comparator network with one conductive state during said image intervals and another conductive state during said blanking intervals in response to said keying signals for sampling and comparing said reference signal and said blanking level during said blanking intervals, said comparator having a first input coupled to said source of reference signal for sensing said reference signal, a second input coupled to said signal transmission channel at a first point for sensing said blanking level, and an output for providing a control signal in response to a signal difference appearing between said first and second inputs and representative of a difference in magnitude between said blanking level and said reference signal;

means coupled to said comparator output for filtering and storing said control signal; and means for coupling said filtered and stored control signal to a second point in said signal transmission channel prior to said first point to form a closed loop with said signal transmission channel, for varying said blanking level in a direction to reduce said signal difference to a minimum.

2. Apparatus according to claim 1, wherein:
said keying signal is coincident with a portion of said blanking interval following a synchronizing pulse interval.

3. Apparatus in accordance with claim 1, wherein:
said reference signal is adjustable in magnitude.

4. Apparatus according to claim 1, wherein:
said comparator network comprises first and second active current conduction devices arranged in a differential amplifier configuration and having a common load network;
said filtering and storing means is coupled to an output electrode of one of said active devices; and
said control signal is coupled to said signal transmission channel from said output electrode.

5. Apparatus according to claim 1, wherein said comparator network comprises:
a differential amplifier including first and second transistors each having base, emitter and collector electrodes and arranged in emitter coupled configuration; said base electrode of said first transistor being coupled to said source of reference signal and said base electrode of said second transistor being coupled to said signal transmission channel at said first point:
an operating current supply coupled to said first and second transistors and responsive to said keying signals;
a load network coupled to said differential amplifier; and
means for coupling said load network to said signal transmission channel at said second point.

6. Apparatus according to claim 5, wherein:
said load network comprises an active load network common to said first and second transistors, and said filtering and storing means.

7. Apparatus according to claim 6, wherein said active load network comprises:
a current mirror network coupled to respective collector circuits of said first and second transistors.

8. Apparatus according to claim 5 and further comprising:
a direct current translating network for coupling said source of reference signal to said base of said first transistor.

9. In a television receiver system including a video signal transmission channel for processing an image representative video signal having periodically recurring image intervals, and image blanking intervals disposed between adjacent image intervals and containing horizontal synchronizing information and a blanking level determinative of image brightness, apparatus comprising:

means for providing a reference signal representative of a desired image blanking level;

means exhibiting one conductive state during said image interval, and another conductive state during said blanking interval for comparing said reference signal and said blanking level during said blanking interval, to provide an output control signal indicative of a difference between said reference signal and said blanking level;

means coupled to an output of said comparing means for filtering and storing said control signal; and means for coupling said filtered and stored control signal to said signal transmission channel, for varying said blanking level in a direction to reduce said difference to a minimum.

10. In a television receiver system including a video signal transmission channel for processing an image representative luminance signal having periodically recurring image intervals, and image blanking intervals disposed between adjacent image intervals and containing horizontal synchronizing information and a blanking level determinative of image brightness, apparatus comprising:

a source of reference signal representative of a desired level of image brightness;

a source of keying signals recurring during each blanking interval and coincident with a portion of said blanking interval containing said blanking level;

a keyed sampling comparator network with one conductive state during said image intervals and another conductive state during said blanking intervals in response to said keying signals for sampling and comparing said reference signal and said blanking level during said blanking intervals, said comparator having a first input coupled to said source of reference signal for sensing said reference signal, a second input coupled to said signal transmission channel at a first point for sensing said blanking level, and an output for providing a control signal in response to a signal difference appearing between said first and second inputs and representative of a difference in magnitude between said blanking level and said reference signal;

means coupled to said comparator output for filtering and storing said control signal; and means for coupling said filtered and stored control signal to a second point in said signal transmission channel prior to said first point to form a closed loop with said signal transmission channel, for varying said blanking level in a direction to reduce said signal difference to a minimum.

11. In a color television receiver system including a video signal transmission path for processing a color image representative video signal, said transmission path including a chrominance channel for processing a chrominance component of said video signal and a luminance channel for processing a luminance component of said video signal, said luminance component having periodically recurring image intervals and image blanking intervals disposed between adjacent image intervals and containing horizontal synchronizing information and a blanking level determinative of image brightness, apparatus comprising:

a source of reference signal representative of a desired level of image brightness;

a source of keying signals recurring during each blanking interval and coincident with a portion of said blanking interval containing said blanking level;

a keyed sampling comparator network with one conductive state during said image intervals and another conductive state during said blanking intervals in response to said keying signals for sampling and comparing said reference signal and said blanking level during said blanking intervals, said comparator having a first input coupled to said source of reference signal for sensing said reference signal, a second input coupled to said luminance channel at a first point for sensing said blanking level, and an output for providing a control signal in response to a signal difference appearing between said first and second inputs and representative of a difference in magnitude between said blanking level and said reference signal;

means coupled to said comparator output for filtering and storing said control signal; and means for coupling said filtered and stored control signal to said luminance channel at a second point prior to said first point to form a closed loop with said luminance channel, for varying said blanking level in a direction to reduce said signal difference to a minimum.

12. In a color television receiver system including a video signal transmission path for processing a color image representative video signal, said transmission path including a luminance channel for processing a luminance component of said video signal having periodically recurring image intervals and image blanking intervals disposed between adjacent image intervals and containing horizontal synchronizing information and a blanking level determinative of image brightness, and a chrominance channel for processing a chrominance component of said video signal, said system also including means for combining signals processed by said luminance and chrominance channels, apparatus comprising:

a source of reference signal representative of a desired level of image brightness;

a source of keying signals recurring during each blanking interval and coincident with a portion of said blanking interval containing said blanking level;

a keyed sampling comparator network with one conductive state during said image intervals and another conductive state during said blanking intervals in response to said keying signals for sampling and comparing said reference signal and said blanking level during said blanking intervals, said comparator having a first input coupled to said source of reference voltage for sensing said reference signal, a second input coupled to an output of said combining means at a first point in said transmission path for sensing said blanking level, and an output for providing a control signal in response to a signal difference appearing between said first and second inputs and representative of a difference in magnitude between said blanking level and said reference signal;

means coupled to said comparator output for filtering and storing said control signal; and means for coupling said filtered and stored control signal to said luminance channel at a second point in said transmission path prior to said first point to form a closed loop with said signal transmission path, for varying said blanking level in a direction to reduce said signal difference to a minimum.

13. Apparatus in accordance with claim 12, wherein: said keying signals occur during a color reference burst signal interval of said blanking interval.

14. Apparatus according to claim 12, wherein:

said chrominance channel includes means for deriving color difference signals; and said combining means combines said color difference signals and said luminance component to produce color representative output video signals; and wherein said second input of said comparator is coupled to an output of said combining means corresponding to said first point.

* * * * *